United States Patent [15] 3,676,606

Gueldenpfennig et al. [45] July 11, 1972

[54] CAMP-ON BUSY CHECKING AND MONITOR CIRCUIT

[72] Inventors: Klaus Gueldenpfennig, Penfield; Uwe A. Pommerening; Stanley L. Russell, both of Webster, all of N.Y.

[73] Assignee: Stromberg-Carlson Corporation, Rochester, N.Y.

[22] Filed: March 5, 1971

[21] Appl. No.: 121,431

[52] U.S. Cl. ....179/18 B6
[51] Int. Cl. ....H04m 3/42
[58] Field of Search ....179/18 BG, 27 FD

[56] References Cited

UNITED STATES PATENTS 3,381,095 4/1968 Baker et al. ....179/27 FD

*Primary Examiner*—William C. Cooper
*Attorney*—Craig, Antonelli, Stewart & Hill

[57] ABSTRACT

Camp-on busy checking and monitor circuit which permits only a single line to camp-on a given line at one time and limits the total number of camp-on connections through use of a memory providing information concerning the lines which are associated with a camp-on connection.

10 Claims, 1 Drawing Figure

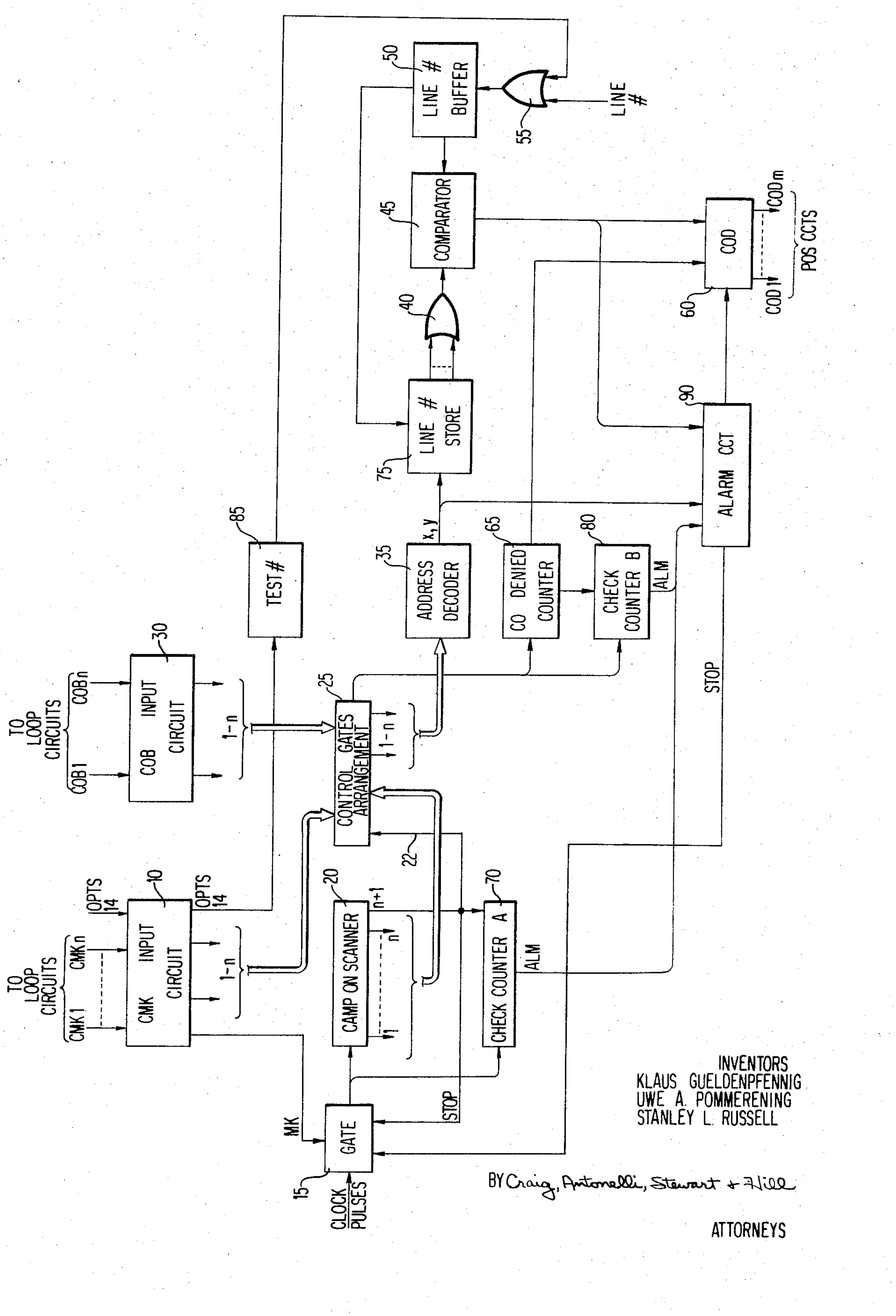
INVENTORS
KLAUS GUELDENPFENNIG
UWE A. POMMERENING
STANLEY L. RUSSELL
BY Craig, Antonelli, Stewart & Hill
ATTORNEYS

CAMP-ON BUSY CHECKING AND MONITOR CIRCUIT

The present invention relates in general to automatic telephone systems, and more particularly to a circuit for controlling the establishment of camp-on connections in a private automatic branch exchange.

Of the many special features which have become available in recent years with the development of automatic telephone systems, the camp-on feature provided in association with private branch exchanges may be the most advantageous in that it provides a service both for the calling subscriber and the operator receiving calls within the system. As is well known, with the camp-on feature, the operator is able to connect an incoming trunk circuit to a line which is already busy on another call so that the second subscriber is literally camped-on the busy line circuit until that line circuit becomes free and available for connection to the camped-on subscriber. Such a feature eliminates the necessity for the calling subscriber to make repeated attempts to establish the communication connection which would greatly increase the incoming traffic to the exchange and inconvenience the subscriber and also permits the operator to handle other calls while the calling subscriber is camped-on the busy line circuit.

In spite of the advantageous aspects of the camp-on feature, there are certain disadvantages associated with this feature which require special control. First of all, a calling subscriber which is camped-on to a busy line circuit occupies a trunk which remains unavailable for other use during the entire period of the camp-on connection. If the camp-on feature is not utilized to any great extent in the system, relatively few trunks and paths through the link networks will be tied up by this feature; however, for systems which are subjected to heavy traffic, a very large number of trunks and paths might be tied up with the camp-on feature, thereby unduly limiting the capability of the system to handle incoming calls. Accordingly, it is desirable to provide control circuitry within the system to limit the number of simultaneous camp-on connections which may be established to a value which will not unduly tie up the system.

A second problem which may arise as a result of a camp-on connection results from the camping on of two subscribers on a single line circuit. If a trunk is already camped-on a busy line circuit and the operator camps a second trunk on the same line circuit, the system will not be able to determine which of the camped-on trunks to connect to the line circuit once it becomes free, unless rather complicated monitoring circuitry is provided to determine the order in which the camped-on trunks are to be serviced. In addition, while a calling party may be willing to wait for a busy line circuit to become free if he is able to connect to that line circuit at the time that it becomes free, most subscribers are unwilling to wait for a line circuit to become free when they are the second party waiting for connection to that line circuit. Thus, it is of advantage to provide in a telephone system having the camp-on feature some monitoring means to determine whether a trunk is already camped-on to a busy line circuit so that a second camp on the same busy line circuit can be avoided.

It is therefore an object of the present invention to provide a camp-on checking and monitor circuit which is capable of determining whether a trunk is already camped-on to a particular line circuit and the total number of line circuits having a trunk camped thereon.

It is another object of the present invention to provide a camp-on checking and monitor circuit of the type described which is capable of association with substantially any type of automatic telephone exchange.

It is a further object of the present invention to provide a camp-on busy checking and monitor circuit which is simple in configuration, dependable in use and economic to manufacture.

These and other objects, features and advantages of the present invention will become more apparent from the following detailed description when taken in conjunction with the accompanying drawing wherein the sole FIGURE is a schematic block diagram of the circuit in accordance with the present invention.

The exemplary embodiment of the present invention is described herein in association with a PABX having a plurality of operators or attendants, with each operator position having enabled periodically in a recurring time slot of a repetitive time frame. However, it will be apparent from the following detailed description that the present invention is also applicable to other systems, such as those where only a single operator or attendant is provided.

As is well known, the camp-on feature relates to the situation where an incoming trunk call connected to the operator or attendant seeks connection to a line circuit which is already busy with another call. The busy condition of the called line circuit is indicated by the system to the attendant when an attempt is made to switch the incoming trunk via a loop circuit to the called line circuit. At that time, the attendant asks the calling subscriber whether he or she wishes to camp-on the busy line; and, if so, initiates the camp-on feature by pressing a button or other device at the attendant's console. The conventional camp-on circuit within the system will then connect the trunk and the associated loop circuit to the busy line circuit in a camp-on condition.

FIG. 1 is a schematic block diagram of the camp-on busy checking and monitor circuit of the present invention which determines (1) whether a trunk is already camped-on the same line circuit which the calling subscriber wishes to camp on, and (2) whether a maximum number of camp-on connections have been already established within the system. The actual circuitry for establishing the camp-on connection in response to a request from the operator or attendant does not form part of the present invention and may therefore be provided in the form of any conventional camp-on circuit. Thus, the camp-on circuitry which establishes the camp-on connection has not been specifically described herein.

On an incoming call to the PABX, the incoming trunk circuit is connected to the attendant position through a loop circuit, and when the attendant attempts to extend the trunk via the loop circuit to a line, a mark is returned from the loop circuit on one of the lines CMK1–CMK$n$ to a camp-on mark input circuit 10. There will be one CMK lead for each of the $n$ loop circuits in the system, and the input circuit 10 will apply the mark on any one of the input lines CMK1–CMK$n$ via line MK to an input of gate 15. The input circuit 10 also provides $n$ output lines 1–$n$ which provide the addresses of the respective loops in a line number to store 75.

The gate 15 selectively connects a source of clock pulses to a camp-on scanner 20 upon receipt of a mark on the MK lead from the input circuit 10.

The camp-on scanner 20 is a standard counter providing successive outputs on a plurality of lines 1–$n$ in response to the received clock pulses, which outputs are applied to a control gate arrangement 25. The control gate arrangement 25 receives the outputs from the address leads 1–$n$ from the input circuit 10 and also receives enabling signals on a plurality of output lines 1–$n$ from a camp-on busy input circuit 30.

The camp-on busy input circuit 30 has a plurality of lines COB1–COB$n$ extending to the respective loop circuits, which lines will be enabled when the loops associated therewith are connected to a trunk circuit which is camped-on to a busy line. Thus, for each loop associated with a camp-on connection, the corresponding camp-on busy line COB1–COB$n$ will receive a mark and the corresponding output line 1–$n$ from the camp-on busy input circuit 30 will also receive that mark.

The control gate arrangement 25 provides a plurality of address outputs on lines 1–$n$ to an address decoder 35 which addresses the line number store 75. The data stored in the addressed location of the line number store 75 is transferred through gate 40 to a comparator 45. Another input of the comparator 45 is connected to a line number buffer 50 which receives the called line number from the exchange via gate 55. The output of comparator 45 is connected to a camp-on deny circuit 60 which has outputs connected to each of the attendant positions to signal when a camp-on deny situation occurs.

An alarm circuit 90 is also provided in case of malfunction of the system. A check counter 70 is connected in parallel with the camp-on scanner 20 and receives clock pulses from the output of gate 15 so as to advance in coincidence with the camp-on scanner 20. Thus, when the scanner 20 reaches a predetermined count, the check counter 70 should also reach the same count. If this coincidence does not occur, an alarm signal will be generated from the counter 70 and will be applied to the alarm circuit 90. A test number circuit 85 is also connected to the gate 55 and receives a test time slot from the input circuit 10 during each time frame to thereby inject a test number into the line number buffer 50 to determine whether this equipment is operating properly. If a comparison is found at this time, an output is provided from the comparator 45 to the alarm circuit 90 indicating a malfunction in the system.

An output is also provided from the control gate arrangement 25 to a camp-on deny counter 65 which counts the number of marks appearing at the output of the camp-on busy input circuit 30. As the outputs from the circuit 30 are scanned in the control gate arrangement 25 by the camp-on scanner 20, the counter 65 is advanced until it reaches a maximum count indicating that no more camp-on connections should be permitted. At that time an output is provided from the counter 65 to the camp-on deny circuit 60.

A check counter 80 is connected in parallel with the camp-on deny counter 65 and receives the same input from the control gate arrangement 25 so as to advance in coincidence with the counter 65. When the counter 65 reaches a predetermined count, if the counts in the counters are not the same, an alarm signal will be generated from the counter 80 and applied to the alarm circuit 90.

Whenever the comparator 45 detects a comparison between the number stored in the line number buffer 50 and that received from the line number store 75 via gate 40, the output therefrom will be forwarded as a stop signal to the gate 15 inhibiting the application of further clock pulses to the camp-on scanner 20.

The operation of the system illustrated in FIG. 1 will now be described. Each time the operator attempts to extend a trunk via a loop to a line, whether or not the line is busy or free, a mark will appear on one of the CMK leads to the input circuit 10, which circuit will advance the mark on the MK lead to enable the gate 15. At the same time, the number of the called line will be transferred from the common control equipment in the exchange via the gate 55 to the line number buffer 50.

With the enabling of gate 15 by the mark applied via the lead MK from the input circuit 10, the clock pulses will advance the camp-on scanner 20 so as to successively enable the leads 1–$n$ connected to the control gate arrangement 25. The inputs from the camp-on scanner 20 and the camp-on busy input circuit 30 are ANDed in the control gate arrangement 25 so as to selectively enable in sequence certain of the leads 1–$n$ connected to the address decoder 35. In this regard, an output address lead from the control gate arrangement 25 will be enabled only if the corresponding lead from the camp-on scanner 20 is enabled and the corresponding lead from the camp-on busy input circuit 30 is enabled. Thus, only those stored positions in the line number store 75 which are associated with a loop forming part of a camp-on connection will be addressed from the output of the control gate arrangement 25. For those loops which are not associated with a camp-on connection, the COB input lead to the input circuit 30 will not be marked and therefore the corresponding output lead from the circuit 30 will also not be marked so that the corresponding gate in the control gate arrangement 25 will not be enabled from the scanner 20.

As the storage locations in the line number store 75 are addressed from the output of the address decoder 35, the data in these locations is transferred in a non-destructive manner via gate 40 to the comparator 45 which compares that number with the line number stored in the line number buffer 50. If a comparison between the two numbers is detected indicating that the line which the operator is attempting to camp-on is already associated with a camp-on connection, the comparator 45 will provide a camp-on deny output to the camp-on deny circuit 60 thereby signaling the attendant that a camp-on connection will not be permitted. At this time, the output of the comparator 45 will also be applied through the alarm circuit 90 as a stop signal to the gate 15 inhibiting the further application of clock pulses to the scanner 20, which stops operation of the scanner. Resetting of the camp-on scanner 20 will be effected thereafter.

As the outputs of the camp-on busy input circuit 30 are scanned by the scanner 20 in the control gate arrangement 25, an output is provided to the camp-on deny counter 65 each time a mark is detected at the output of the camp-on busy input circuit 30. In this way, each time the loop circuits are scanned, the number of loops associated with a camp-on connection is counted by the camp-on deny counter 65. When the counter 65 reaches a count corresponding to the maximum permissible camp-on connections allowed in the system, a camp-on deny signal is generated and applied to the camp-on deny circuit 60, so that the attendant can be signaled that camp-on will not be permitted. A stop signal will also be generated a this time to inhibit the gate 15 and prevent further operation of the camp-on scanner 20.

If, after all of the loops have been scanned by the camp-on scanner 20, no comparison is detected between the numbers stored in the line number store 75 and the line number stored in the line number buffer 50, the scanner 20 will advance to a count of $n + 1$ providing a stop signal to the gate 15 to inhibit the application of further clock pulses and will also forward a control signal via line 22 to the control gate arrangement 25 to connect the address leads at the output of the camp-on mark input circuit 10 to the address leads at the output of the control gate arrangement 25. This will extend the mark from the single CMK lead at the input of the input circuit 10 as an address signal to the address decoder 35 to thereby address the storage location in the line number store 75 associated with the particular loop involved. At this time, the number stored in the line number buffer 50 will be transferred to the line number store 75 in that address storage location.

It should be noted that the line number store 75 is advantageously provided in accordance with the present invention as a non-destructive read-out memory. Thus, all of the data which is read into and stored in the various storage locations in the line number store 75 are retained in the store and are eliminated only by the recording of a new number over the old number in the storage location. Thus, the various storage locations in the line number store 75 will contain during normal operation numbers identifying loops which are presently associated with camp-on connections and also numbers of loops which were previously associated with camp-on connections but are no longer associated with such connections. However, since only the storage locations associated with loops presently in a camp-on condition are addressed as a result of the ANDing of the outputs of the camp-on busy input circuit 30 and the outputs of the camp-on scanner 20, the presence of the old data in the line number store 75 is of no consequence since it will not be addressed. This arrangement greatly simplifies the storage of data by eliminating the need for complicated control circuitry for writing in and erasing data.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is is:

1. In an automatic private branch exchange including a plurality of trunk circuits, a plurality of line circuits, a plurality of loop circuits, common control means for connecting selected trunks to selected line circuits and capable of establishing a camp-on connection of a trunk to a busy line circuit via a loop circuit, a camp-on monitor and control circuit, comprising:

buffer means for storing a designation of a selected line circuit to which a trunk circuit is to be camped-on, storage means for storing in respective storage areas allocated to said loop circuits designations of line circuits associated with a camp-on connection, a comparator connected to the outputs of said buffer means and said storage means for generating a camp-on deny signal upon receipt of identical designations from said buffer means and said storage means, and scanning means responsive to an operator function for sequentially gating the designations in said storage means to said comparator.

2. A system as defined in claim 1, wherein said scanning means gates only those storage areas allocated to loop circuits which are presently associated with a camped-on trunk circuit.

3. A system as defined in claim 1, wherein said scanning means includes camp-on busy circuit means providing outputs on a plurality of lines indicating those loop circuits which are associated with a trunk circuit in a camped-on condition, camp-on scanner means providing outputs on a plurality of lines allocated to the respective storage areas in said storage means, control gate means responsive to the outputs from said camp-on busy circuit means and said camp-on scanner means for enabling selected ones of a plurality of address lines designating loop circuits associated with a camped-on trunk, and address means responsive to said address lines from said control gate means for sequentially enabling selected storage areas in said storage means.

4. A system as defined in claim 3, wherein said storage means is provided as a memory providing non-destructive read-out to said comparator.

5. A system as defined in claim 4, further including input circuit means responsive to a condition in any loop circuit representing initiation of connection of a trunk to a line circuit for generating a check signal, and gating means responsive to receipt of a check signal for initiating operation of said scanning means.

6. A system as defined in claim 5, wherein said camp-on deny signal generated by said comparator is connected to said gating means to inhibit further operation of said scanning means.

7. A system as defined in claim 6, wherein said input circuit means provides additional address lines which are selectively enabled by the loop circuit initiating the camp-on check by effecting generation of said check signal and said camp-on scanner means includes a last output line connected to said control gate means for connecting said additional address lines to said address means, to thereby effect transfer of the designation in said buffer means into the storage area of said storage means allocated to said loop circuit initiating the camp-on check.

8. A system as defined in claim 3, further including camp-on counter means connected to said control gate means for counting the number of loops associated with a camp-on connection during each scan and for generating a camp-on deny signal when said count reaches a predetermined value.

9. A system as defined in claim 8, wherein said storage means is provided as a memory providing non-destructive read-out to said comparator.

10. A system as defined in claim 9, further including input circuit means responsive to a condition in any loop circuit representing initiation of connection of a trunk to a line circuit for generating a check signal, and gating means responsive to receipt of a check signal for initiating operation of said scanning means.

* * * * *